United States Patent
Bacher et al.

(10) Patent No.: US 8,539,134 B2
(45) Date of Patent: Sep. 17, 2013

(54) PCI EXPRESS MULTIPLIER DEVICE

(75) Inventors: Utz Bacher, Weil im Schoenbuch (DE); Hartmut Penner, Hildrizhausen (DE); Heiko Schick, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 13/024,456

(22) Filed: Feb. 10, 2011
(Under 37 CFR 1.47)

(65) Prior Publication Data
US 2011/0202703 A1    Aug. 18, 2011

(51) Int. Cl.
*G06F 13/20*    (2006.01)
*G06F 13/38*    (2006.01)

(52) U.S. Cl.
CPC .................................... *G06F 13/385* (2013.01)
USPC ............................. 710/313; 710/314; 710/316

(58) Field of Classification Search
USPC ....................... 710/305–317, 8–19; 714/1, 25
See application file for complete search history.

(56) References Cited

U.S. PATENT DOCUMENTS

| | | | |
|---|---|---|---|
| 7,340,557 B2 * | 3/2008 | Kong et al. | 710/316 |
| 7,370,224 B1 | 5/2008 | Jaswa et al. | |
| 7,966,440 B2 * | 6/2011 | Namba | 710/309 |
| 8,285,907 B2 * | 10/2012 | Chappell et al. | 710/305 |
| 2002/0023190 A1 * | 2/2002 | Peng | 710/308 |
| 2007/0204095 A1 * | 8/2007 | Sandy et al. | 710/316 |
| 2008/0034147 A1 * | 2/2008 | Stubbs et al. | 710/315 |
| 2009/0119432 A1 * | 5/2009 | Lee et al. | 710/113 |
| 2012/0144087 A1 * | 6/2012 | Buckland et al. | 710/316 |

OTHER PUBLICATIONS

PCI Express Base Specification Revision 3.0, Version 0.3, May 22, 2008.

* cited by examiner

*Primary Examiner* — Raymond Phan
(74) *Attorney, Agent, or Firm* — James R. Nock

(57) ABSTRACT

An improved PCI Express multiplier device is disclosed. The PCI Express multiplier device comprises two or more device attachers to attach at least two identical PCI Express devices; a root complex attacher to attach a PCI Express root complex; a copier to copy and forward PCI Express data packets from the root complex to all of the attached identical devices; a collector to collect PCI Express data packets sent from the attached identical devices to the root complex; a selector responsive to the collector to select and forward PCI Express data packets from the collected PCI Express data packets to the root complex.

7 Claims, 10 Drawing Sheets

PCI EXPRESS MULTIPLIER DEVICE

BACKGROUND OF THE INVENTION

1. Field of the Invention

The present invention relates in general to the field of computer systems using PCI Express technology, especially implemented input/output (I/O) and accelerator components, and in particular to a PCI Express multiplier device, a corresponding computer system comprising such a PCI Express multiplier device, and a corresponding method for operating PCI Express devices in a computer system. Still more particularly, the present invention relates to a data processing program and a computer program product for operating PCI Express devices in a computer system.

2. Description of the Related Art

The IT industry tries to create reliable systems based on inexpensive and less reliable components. For the goal of reliable systems, this bears several challenges like failures of components, since inexpensive components may fail completely, or silent data corruption (SDC), since inexpensive components may corrupt data. Due to the lack of consistent error checking, this data corruption may be propagated out of the component and remain unnoticed, which means the computer system works with corrupt data and is not aware of that. While failures do not endanger system integrity but potentially "only" cause outage, the SDC problem is a much more serious problem in the industry.

The present invention addresses these problems for I/O and accelerator components, specifically Peripheral Component Interconnect Express (PCI Express) devices, and shows a way to detect and recover from failures and silent data corruption without changing the I/O respective accelerator components and software. PCI Express is a very common and inexpensive technology for attaching I/O devices and accelerators.

Moreover, the PCI Express link technology allows for error detection of data transfers between computer systems and I/O components respective accelerators.

In Patent Publication U.S. Pat. No. 7,370,224 B1, "SYSTEM AND METHOD FOR ENABLING REDUNDANCY IN PCI EXPRESS ARCHITECTURE" by Jaswa et al., a method and system to enable redundancy in the communication between a plurality of peripheral devices and redundant hosts through redundant switches are disclosed. The peripheral devices and the host are connected through PCI Express architecture in a data processing system. A described embodiment of the system includes a switch, a redundant switch, and a switch-level exchanging means. The switch-level exchanging means enables the exchange of data packets between the peripheral devices and the host, through an available switch. The available switch is either the switch or the redundant switch. Another described embodiment of the system also includes a redundant host and host-level exchanging means. The host-level exchanging means enables the exchange of data packets between an available host and the available switch. The available host is either the host or the redundant host. The described embodiments try to make the corresponding systems redundant. But no silent data corruption is detected and no transparency to software is available. Also in case of a peripheral device failure, software needs to recover/activate another peripheral device, and a switched infrastructure is needed. Also the switches and devices have to communicate with each other to ensure redundancy, these impacts peripheral devices.

In the Patent Application Publication WO 2006/137029 A1, "METHOD FOR PARALLEL DATA INTEGRITY CHECKING OF PCI EXPRESS DEVICES" by Wood et al., an apparatus and method for supporting PCI Express are disclosed. A physical layer has a PCI Express interface for receiving data from a PCI Express compatible communication medium. The data is in the form of a packet. A data link layer is disclosed for verifying a CRC (Cyclic Redundancy Check) value and a sequence number received within the packet. A transaction layer is disclosed for receiving the packet from the data link layer and for processing thereof. The transaction layer processes at least some of the packet data in parallel to the data link layer. The apparatus does parallel checking for data integrity, however, it only covers acceleration of CRC checking of a single device, not checking, whether the device itself didn't corrupt data. Therefore, it does not detect silent data corruption of the peripheral device.

SUMMARY OF THE INVENTION

The present invention provides a PCI Express multiplier device, a computer system comprising such a PCI Express multiplier device and a method for operating PCI Express devices in a computer system, which are able to detect errors and/or silent data corruption to create reliable computer systems, and to provide a data processing program and a computer program product to perform the method for operating PCI Express devices in a computer system.

Accordingly, in an embodiment of the present invention a PCI Express multiplier device comprises at least two device attachers to attach at least two identical PCI Express devices; a root complex attacher to attach a PCI Express root complex; a copier to copy and forward PCI Express data packets from the root complex to all of the attached identical devices; a collector to collect PCI Express data packets sent from the attached identical devices to the root complex; a selector responsive to the collector to select and forward PCI Express data packets from the collected PCI Express data packets to the root complex.

In further embodiments of the present invention, the root complex is a component of a computer system, wherein the attached devices are accelerators for the computer system.

In further embodiments of the present invention, the selector comprises a comparator to compare related response packages for data equality; a forwarder responsive to the comparator for forwarding one of the related response packages in case all the related response packages comprise equal data.

In another embodiment of the present invention, a computer system comprises a host device, comprising a processor and a memory, running operating system software and application software, at least two identical PCI Express devices, a PCI Express multiplier device, providing access to the at least two identical PCI Express devices through presenting the identical PCI Express devices as single PCI Express device, acting as PCI Express endpoint to the host unit, and acting as root complex to the identical PCI Express devices, thereby acting transparently during initialization and operation of the identical PCI Express devices, PCI Express connection, coupling the host device and the PCI Express multiplier device, and PCI Express connection between the PCI Express multiplier device and the at least two PCI Express devices.

In further embodiments of the present invention, the PCI Express multiplier device detects errors and silent data corruption through comparing results of PCI Express transactions between the PCI Express multiplier device and the at least two PCI Express devices.

In further embodiments of the present invention, the PCI Express multiplier device is able to correct errors and silent data corruption when at least three identical PCI Express devices are representing a single PCI Express device through the PCI Express multiplier device, where the best k out of n parallel results of a PCI Express transaction on the links between the PCI Express multiplier device and the at least three identical PCI Express devices are used, wherein n is a number greater than 2 and k is a number greater than n/2.

In further embodiments of the present invention, detection of different transactions on the links between the PCI Express multiplier device and the identical PCI Express devices is performed by comparing CRC checksums of the transactions instead of comparing the entire transactions.

In further embodiments of the present invention, logging to the host device is performed on detection or correction of errors and silent data corruption.

In further embodiments of the present invention, isolation of faulty PCI Express devices is performed on detection or correction of errors and silent data corruption.

In another embodiment of the present invention, a method for operating PCI Express devices in a computer system comprising a host device, comprising a processor and a memory, running operating system software and application software, and at least two identical PCI Express devices, is characterized by providing access to the at least two identical PCI Express devices through presenting the identical PCI Express devices as single PCI Express device by using a PCI Express multiplier device acting as PCI Express endpoint to the host device and acting as root complex to the identical PCI Express devices.

In further embodiments of the present invention, PCI Express data packets from the root complex are copied and forwarded to all of the attached identical devices.

In further embodiments of the present invention, PCI Express data packets sent from the attached identical devices to the root complex are collected and compared for data equality, wherein one PCI Express data packet of the collected PCI Express data packets is selected and forwarded to the root complex based on the comparison.

In another embodiment of the present invention, a data processing program for execution in a data processing system comprises software code portions for performing a method for operating PCI Express devices in a computer system when the program is run on the data processing system.

In yet another embodiment of the present invention, a computer program product stored on a computer-usable medium, comprises computer-readable program means for causing a computer to perform a method for operating PCI Express devices in a computer system when the program is run on the computer.

All in all, embodiments of the present invention disclosed herein introduce a PCI Express multiplier device that allows attaching several identical PCI endpoint devices to a system while all endpoint devices are kept in synchronization and act as one endpoint device. Failure tolerance and silent data corruption (SDC) detection can be achieved by employing at least two endpoint devices, wherein silent data corruption (SDC) correction can be achieved by employing at least three endpoint devices. The PCI Express multiplier devices according to embodiments of the present invention are fully PCI Express compliant.

The present invention allows using inexpensive components, but several identical of them and a PCI Express multiplier device to build a reliable system. According to an embodiment of the invention, a PCI Express multiplier device is implemented to which several PCI Express endpoint devices are connected. The PCI Express multiplier device looks like an endpoint device to the host device. The PCI Express multiplier device forwards packets from the host device to all connected endpoint devices. To the endpoint devices, the PCI Express multiplier device looks like the host device. Packets from the endpoint devices are not directly forwarded to the host device, instead the multiplier device waits until there are packets from each connected endpoint device. If all packets are the same, it passes on one of the packets to the host device. If not, it can rule out defective devices by comparing the packets. If best two of three algorithm is used, for example, a third device must be defect if two of three devices have passed the same packets to the PCI Express multiplier device. Timeouts, i.e., an endpoint device is not sending a packet, while the other endpoint devices did, can be treated like a device failure. Embodiments of the invention prevent silent data corruption (SDC) without modifying software or hardware and may be using PCI Express devices like cell accelerator boards, GPUs, Crypto assist cards, etc. Also, embodiments of the present invention are relevant to each system in a data center that uses PCI Express devices as accelerators and that relies on the data generated by that device.

The PCI Express multiplier device itself is invisible from a PCI Express standpoint, it only passes through data. Logging can be performed and a configuration element can be used to prepare replacement actions of devices. Embodiments of the present invention may be used for deterministic devices, i.e., no real random number generators, but most devices use pseudo random number generators, if at all. As the initialization flow and actions of identical accelerators are identical, packets must be the same on the transaction layer. For devices with external connectivity which might introduce indeterministic behavior like Ethernet cards, a multiplier PHY device can be employed to make sure the connectivity is consistent among all PCI Express devices.

A specific example where this invention can be used is a known IBM Corporation® System Z® environment, in which accelerators, especially Cell/B.E. Accelerator Boards of the applicant are attached using PCI Express technology. In alternative embodiments, other accelerator boards may be used. System z's® qualities in ensuring data integrity are well known; however, inexpensive components like accelerators often only have consumer quality and do not fulfill the data integrity standards of System Z®. Worst case in this scenario is silent data corruption of the accelerator components, which means that the z system will use incorrect data for further processing.

Embodiments of the present invention allow to transparently using several inexpensive accelerators to avoid this, and allow doing so without changes to the host software, host hardware, accelerator software, and accelerator hardware. None of these advantages have been achieved by existing technology. There are multicast extension drafts to PCI Express 3.0; however, compared to the embodiments of the present invention, these extensions are missing transparency to software, transparency to endpoint devices, implicit error checking, and silent data corruption detection. Advantageous embodiments of the present invention are able to create reliable computer systems with common-off-the-shelf, unreliable components without software hit. So embodiments of the present invention offer great benefit in the area of hybrid computing and acceleration through PCI Express accelerator devices.

The above, as well as additional purposes, features, and advantages of the present invention, will become apparent in the following detailed written description.

BRIEF DESCRIPTION OF THE DRAWINGS

An embodiment of the invention, as described in detail below, is shown in the drawings, in which.

DETAILED DESCRIPTION OF THE PREFERRED EMBODIMENTS

Figure 1:
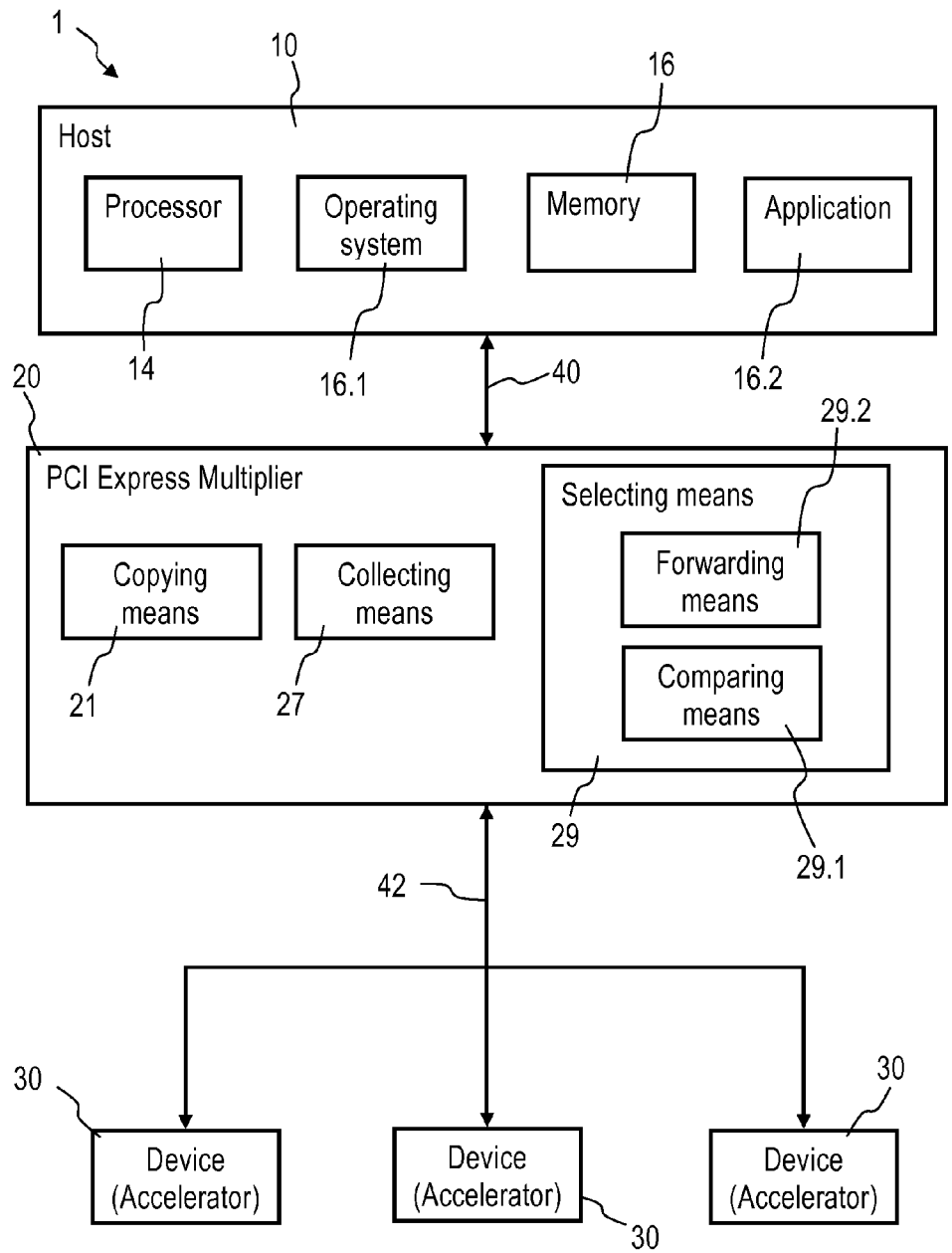
FIG. 1 is a schematic block diagram of a computer system, in accordance with an embodiment of the present invention.

FIG. 1 is a schematic block diagram of a computer system 1, in accordance with an embodiment of the present invention, comprising a host device 10, which comprises a processor 14 and a memory 16, running operating system software 16.1, and application software 16.2, a PCI Express multiplier device 20 and several PCI Express devices 30. The host device 10 is coupled to the PCI Express multiplier device 20 by using a first PCI Express connection 40 and the PCI Express devices 30 are coupled to the PCI Express multiplier device 20 by using second PCI Express connections 42.

FIG. 2 to 5 is each showing a more detailed block diagram of the computer system shown in FIG. 1 during different transactions.

Referring to FIG. 1 to 5, the shown embodiment of the invention employs a PCI Express multiplier device 20 comprising device attachment means 24, 26, 28 to attach at least two identical PCI Express devices 30; root complex attachment means 22 to attach a PCI Express root complex 10; copying means 21 to copy and forward PCI Express data packets 2, 3, 4, 5 from the root complex 10 to all of the attached identical devices 30; collecting means 27 to collect PCI Express data packets 2, 3, 4, 5 sent from the attached identical devices 30 to the root complex 10; selecting means 29 responsive to the collecting means 27 to select and forward PCI Express data packets 2, 3, 4, 5 from the collected PCI Express data packets 2, 3, 4, 5 to the root complex 10, wherein the selecting means 29 comprise comparing means 29.1 to compare related response packages 2, 3, 4, 5 for data equality, and forwarding means 29.2 responsive to the comparing means 29.1 for forwarding one of the related response packages 2, 3, 4, 5 in case all of the related response packages 2, 3, 4, 5 comprise equal data. In the shown embodiment of the present invention the root complex 10 is represented by the host device 10 of the computer system 1 and the attached devices 30 are accelerators for the computer system 1.

In the illustrated embodiment during initialization in a first step, the PCI Express multiplier device 20 is doing the link negotiation sequence to the corresponding root complex 10 and to all connected endpoint devices 30. During a second step, the PCI Express multiplier device 20 compares the signature of all connected endpoint devices 30 to be sure that the devices 30 are equal. This guarantees a deterministic behavior. The signature of an endpoint device 30 is defined by the PCI Express configuration space and comprises PCI configuration space registers with Device ID, Vendor ID, Class Code, Revision ID, Subsystem ID, Subsystem Vendor ID, Status, Command, Device Status, Device Control, Link Status, Link Control, Slot Status, and Slot Control. During a third step, the PCI Express multiplier device 20 verifies that the endpoint devices 30 are working and are not in an error state. This can be done by the usage of an advanced error reporting capability, for example. During a fourth step, the PCI Express multiplier device 20 is reported as PCI bridge device to the root complex 10 so that it will be transparent to upper level firmware, device driver, and operating system and application software. During a fifth step, the status is optionally logged.

Another embodiment of this invention could omit the second to fifth step, when the operating system software initializes the device by working on the PCI configuration space, any mismatches in the configuration space respective the devices will be noticed. Disadvantage is that a mixture of devices will not be recognized immediately after power-up; however, it will be recognized before operation. Advantage of this approach is that the PCI Express multiplier device 20 can be implemented even simpler.

The PCI Express multiplier device 20 achieves its redundancy for endpoint device 30 via the usage of multiple endpoint devices 30 that have the same characteristic. The root complex 10 will see only one endpoint device and doesn't know that the PCI Express multiplier device 20 is connected to several endpoint devices 30 with the same characteristic. To get redundancy the PCI Express multiplier device 20 receives requests from the root complex 10 or the endpoint devices 30 will spawn or combine them and compare the behavior. If the behavior is the same, the PCI Express multiplier device 20 recognizes the request as valid and will route to the corresponding target. Therefore, the same deterministic behavior of the endpoint devices 30 is very useful.

In order to get the deterministic behavior, the PCI Express multiplier device 20 has to handle the several PCI Express requests in a different way. This will be explained in accordance with Table 1. In which (1) is representing non-posted inbound requests, (2) is representing posted inbound requests, and (3) is representing non-posted and posted outbound requests.

TABLE 1

| Request | Inbound Request Handling (RC –> FTPEM –> EP) | Outbound Request Handling (RC <– FTPEM <– EP) |
|---|---|---|
| Memory Read Request | (1) | (3) |
| Memory Read Request (Locked Access) | (1) | (3) |
| Memory Write Request | (2) | (3) |
| IO Read | (1) | (3) |
| IO Write | (1) | (3) |

TABLE 1-continued

| Request | Inbound Request Handling (RC -> FTPEM -> EP) | Outbound Request Handling (RC <- FTPEM <- EP) |
|---|---|---|
| Configuration Read (Type 0 and Type 1) | (1) | (3) |
| Configuration Write (Type 0 and Type 1) | (1) | (3) |
| Message Request without Data | (2) | (3) |
| Message Request with Data | (2) | (3) |
| Completion without Data | Response to (1) | Response to (3) |
| Completion with Data | Response to (1) | Response to (3) |
| Completion without Data (Associated with Locked Memory Read) | Response to (1) | Response to (3) |
| Completion with Data (Associated with Locked Memory Read) | Response to (1) | Response to (3) |

To handle a non-posted inbound request (1), the PCI Express multiplier device 20 spawns the request from the root complex 10 to all endpoint devices 30 and verifies if it receives from all endpoint devices 30 the same completion. To verify if the received completion with or without data fits to the received completion, the PCI Express multiplier device 20 will do the following steps:
1. Remember the tag of the request.
2. Send the request to all endpoint devices 30.
3. Wait for and proof if for all endpoint devices a completion with the remembered corresponding tag is received and verify if the status and the data is the same.
4. If the verification was successful, the PCI Express multiplier device 20 recognizes the completion as valid and will pass it to the root complex 10.
5. If the verification was not successful, the PCI Express multiplier device 20 creates a new completion with a bad status code and optionally logs the error.

To handle a posted inbound request (2), the PCI Express multiplier device 20 spawns the request from the root complex 10 to all endpoint devices 30.

To handle a non-posted and posted outbound request (3), the PCI Express multiplier device 20 receives on one of its connected endpoint devices 30 a request and will do the following steps:
1. Remember the signature of the request. The signature is received via the request type, the target address and the data of the request.
2. Wait if from the residual endpoint devices 30 the same request with the same signature is received in a given amount of time.
3. If yes, pass it to the root complex 10.
4. If not, don't accept the request and don't pass it to the root complex 10.
5. Optionally log an error As optional enhancements the PCI Express multiplier device 20 can compare CRC checksums of the requests instead of comparing signatures. This allows finding out differences between requests with adequate probability while reducing effort to compare requests. Additionally an enhanced error logging may be performed. The extensions can allow for logging errors in a System Z® complex that would result in support element action and according repair actions, like replacement of defective adapters. This is state of the art in RAS technology and can be applied to this invention, too.

In the shown embodiment, the PCI Express multiplier device 20 provides access to several identical PCI Express devices 30 through presenting the identical PCI Express devices 30 as single PCI Express device, acting as root complex 24, 26, 28 to the identical PCI Express devices 30 and acting as PCI Express endpoint 22 to the host unit 10, thereby acting transparently during initialization and operation of the identical PCI Express devices 30.

With two identical PCI Express devices 30 represented as single PCI Express device through the PCI Express multiplier device 20, the PCI Express multiplier device 20 can detect errors and silent data corruption through comparing results of PCI Express transactions between the PCI Express multiplier device 20 and the two PCI Express devices 30.

With three identical PCI Express devices 30 represented as single PCI Express device through the PCI Express multiplier device 20, the PCI Express multiplier device 20 is able to correct errors and silent data corruption through comparing results of PCI Express transactions between the PCI Express multiplier device 20 and the three PCI Express devices 30. For correction the PCI Express multiplier device 20 uses the best two out of three parallel results of a PCI Express transaction on the three links 42 between the PCI Express multiplier device 20 and the three identical PCI Express devices 30. The detection of different transactions on the links 42 between the PCI Express multiplier device 20 and the identical PCI Express devices 30 can be performed, for example, by comparing CRC (Cyclic Redundancy Check) checksums of the transactions instead of comparing the entire transactions. The logging to the host device 10 may be performed on detection or correction of errors and silent data corruption. The isolation of faulty PCI Express devices 30 may be performed on detection or correction of errors and silent data corruption.

Figure 2:
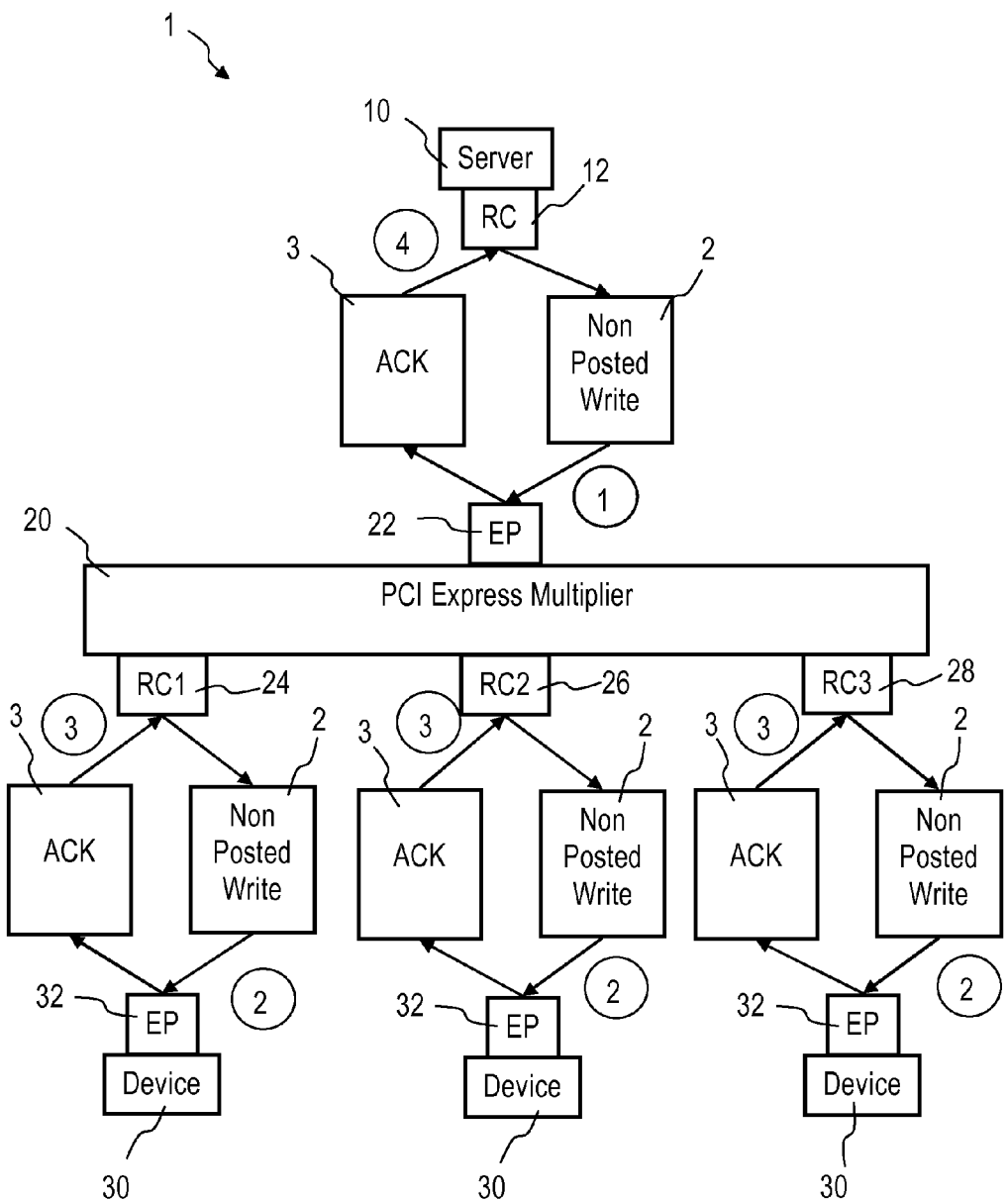
FIG. 2 is a more detailed block diagram of the computer system shown in FIG. 1 to show a root complex non-posted write transaction.

FIG. 2 is a more detailed block diagram of the computer system shown 1 to show a root complex non-posted write transaction.

Referring to FIG. 2 during a root complex non-posted write transaction in a first transaction step 1, a non-posted write request 2 is send from the host device 10 (server) to the PCI Express multiplier device 20. The host device 10 uses an attachment means 12 representing a root complex to send the non-posted write request 2 and the PCI Express multiplier device 20 uses an attachment means 22 representing an endpoint for receiving the non-posted write request 2 during transaction step 1. After receiving the non-posted write request 2 the PCI Express multiplier device 20 copies the received non-posted write request 2 and sends out non-posted write requests 2 to the three endpoint devices 30 during transaction step 2. The PCI Express multiplier device 20 uses three attachment means 24, 26, 28 each represent a root complex to send the non-posted write requests 2 and the three PCI Express devices 30 use attachment means 32 representing an endpoint for receiving the non-posted write requests 2 during transaction step 2. During transaction step 3 the PCI Express devices 30 send back an acknowledgment (ACK) package 3 to the PCI Express multiplier device 20. The PCI Express devices 30 use the attachment means 32 representing an endpoint to send the acknowledgment (ACK) package 3 and the PCI Express multiplier device 20 uses the attachment means 24, 26, 28 each represent a root complex for receiving the acknowledgment (ACK) package 3 during transaction step 3. The PCI Express multiplier device 20 waits for a given timeout period for all acknowledgment (ACK) packages 3 of the three PCI Express devices 30 and checks the acknowledgment (ACK) packages 3 for equality. If all three acknowledgment (ACK) packages 3 are coming in time and are equal, an acknowledgment (ACK) package 3 is send from the PCI Express multiplier device 20 to the host device 10 during transaction step 4. The PCI Express multiplier device 20 uses the attachment means 22 representing an endpoint to send the acknowledgment (ACK) package 3 and the host device 10 uses the attachment means 12 representing a root complex to receive the acknowledgment (ACK) package 3 during transaction step 4.

Figure 3:
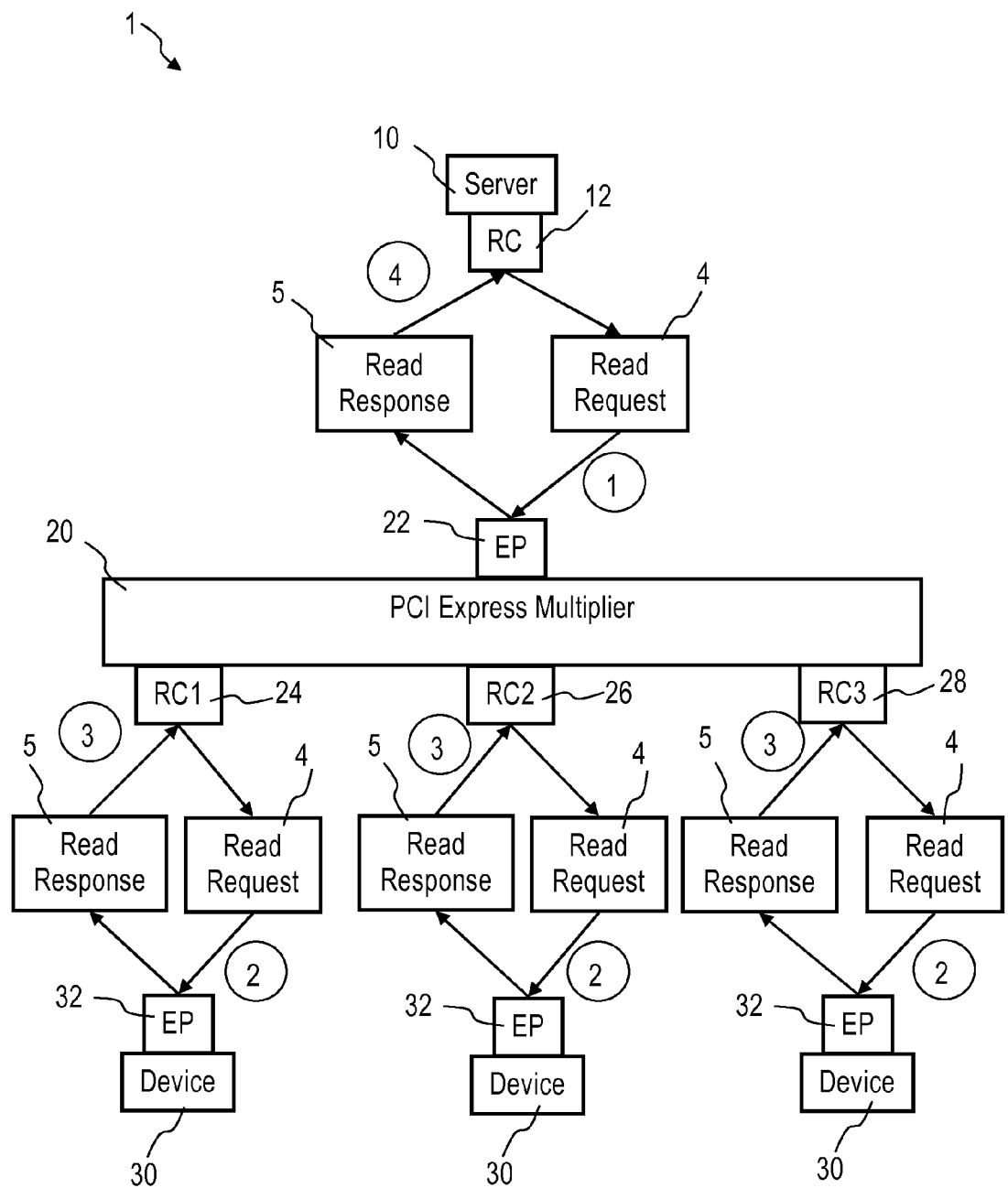
FIG. 3 is a more detailed block diagram of the computer system shown in FIG. 1 to show a root complex read transaction.

FIG. 3 is a more detailed block diagram of the computer system shown in FIG. 1 to show a root complex read transaction.

Referring to FIG. 3 during a root complex read transaction in a first transaction step 1, a read request 4 is send from the host device 10 (server) to the PCI Express multiplier device 20. The host device 10 uses the attachment means 12 to send the read request 4 and the PCI Express multiplier device 20 uses the attachment means 22 for receiving the read request 4 during transaction step 1. After receiving the read request 4 the PCI Express multiplier device 20 copies the read request 4 and sends out read requests 4 to the three endpoint devices 30 during transaction step 2. The PCI Express multiplier device 20 uses the three attachment means 24, 26, 28 to send the read request 4 and the three PCI Express devices 30 use the attachment means 32 for receiving the read request 4 during transaction step 2. During transaction step 3 the PCI Express devices 30 send back a read response package 5 to the PCI Express multiplier device 20. The PCI Express devices 30 use the attachment means 32 to send the read response package 5 and the PCI Express multiplier device 20 uses the attachment means 24, 26, 28 for receiving the read response package 5 during transaction step 3. The PCI Express multiplier device 20 waits for a given timeout period for all read response packages 5 of the three PCI Express devices 30 and checks the read response packages 5 for equality. If all three read response packages 5 are coming in time and are equal, a read response package 5 is send from the PCI Express multiplier device 20 to the host device 10 during transaction step 4. The PCI Express multiplier device 20 uses the attachment means 22 to send the read response package 5 and the host device 10 uses the attachment means 12 to receive the read response package 5 during transaction step 4.

Figure 4:
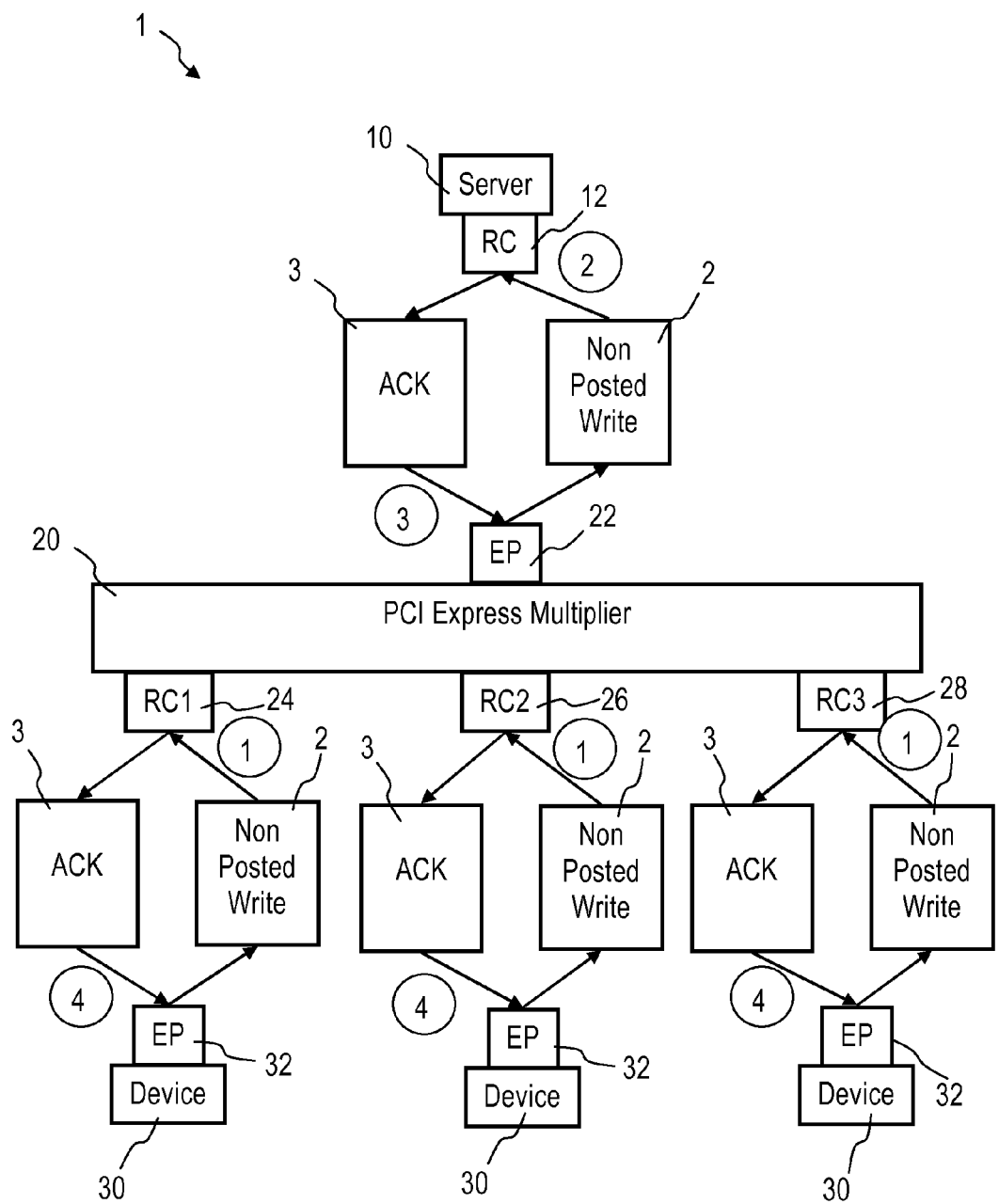
FIG. 4 is a more detailed block diagram of the computer system shown in FIG. 1 to show an end point non-posted write transaction.

FIG. 4 is a more detailed block diagram of the computer system shown in FIG. 1 to show an end point non-posted write transaction.

Referring to FIG. 4 during an endpoint non-posted write transaction in a first transaction step 1, a non-posted write request 2 is send from the PCI Express devices 30 to the PCI Express multiplier device 20. The PCI Express devices 30 use the attachment means 32 to send the non-posted write requests 2 and the PCI Express multiplier device 20 uses the attachment means 24, 26, 28 to receive the non-posted write requests 2 during transaction step 1. The PCI Express multiplier device 20 stores the non-posted write requests 2 from each PCI Express device 30 in corresponding queues. After detecting three equal packets in the queues, the PCI Express multiplier device 20 sends out a non-posted write request 2 to the host device 10 during transaction step 2. The PCI Express multiplier device 20 uses the attachment means 22 to send the non-posted write request 2 and the host device 10 uses the attachment means 12 for receiving the non-posted write request 2 during transaction step 2. During transaction step 3 the host device 10 sends back an acknowledgment (ACK) package 3 to the PCI Express multiplier device 20. The host device 10 uses the attachment means 12 to send the acknowledgment (ACK) package 3 and the PCI Express multiplier device 20 uses the attachment means 22 for receiving the acknowledgment (ACK) package 3 during transaction step 3. The PCI Express multiplier device 20 copies the acknowledgement (ACK) package 3 and sends the acknowledgment (ACK) packages 3 to the three PCI Express devices 30 during transaction step 4. The PCI Express multiplier device 20 uses the attachment means 24, 26, 28 to send the acknowledgment (ACK) packages 3 and the PCI Express devices 30 use the attachment means 32 to receive the acknowledgment (ACK) package 3 during transaction step 4.

Figure 5:
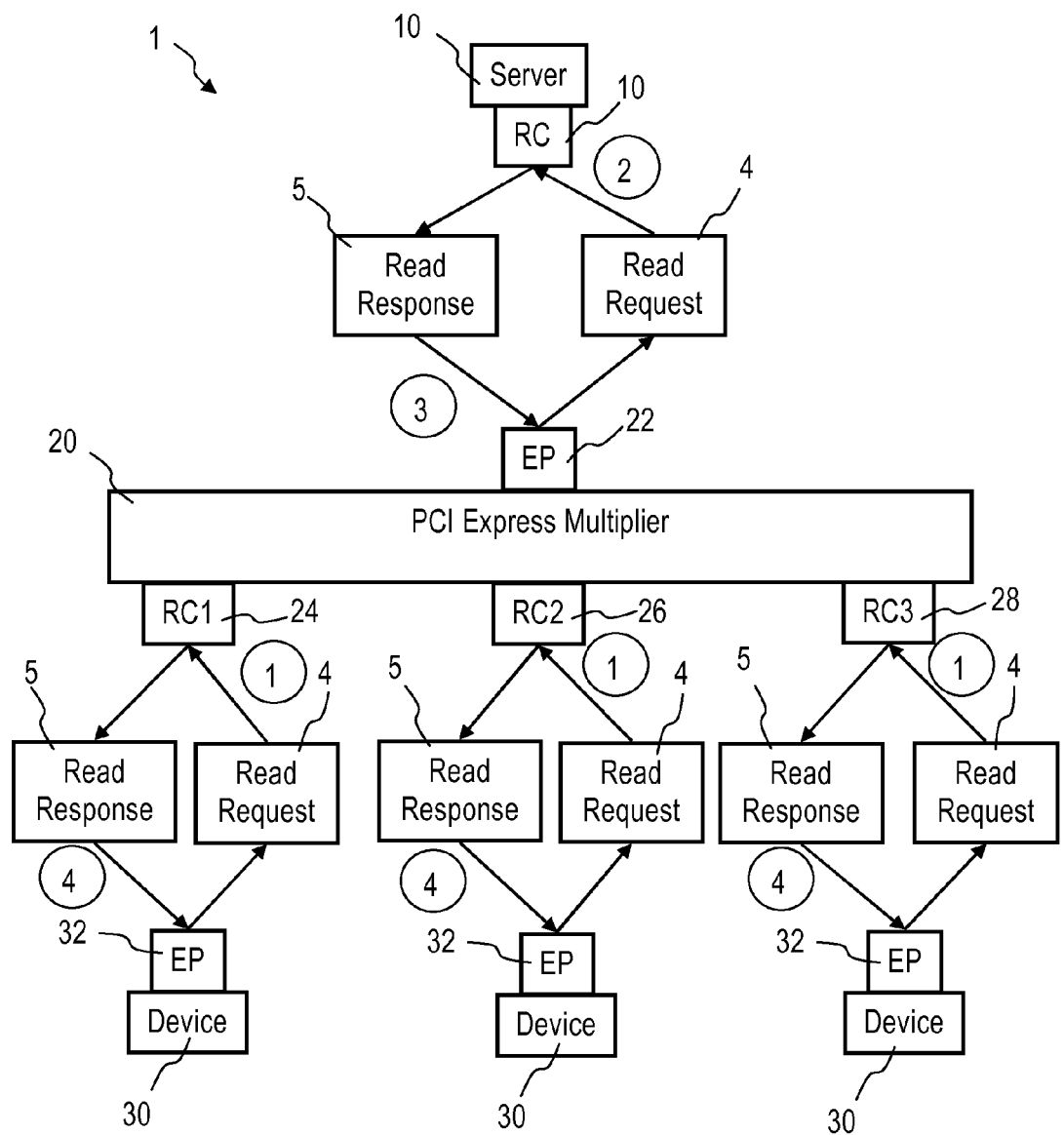
FIG. 5 is a more detailed block diagram of the computer system shown in FIG. 1 to show an end point read transaction.

FIG. 5 is a more detailed block diagram of the computer system shown in FIG. 1 to show an end point read transaction.

Referring to FIG. 5 during an endpoint read transaction in a first transaction step 1, a read request 4 is send from the PCI Express devices 30 to the PCI Express multiplier device 20. The PCI Express devices 30 use the attachment means 32 to send the read requests 4 and the PCI Express multiplier device 20 uses the attachment means 24, 26, 28 to receive the read requests 4 during transaction step 1. The PCI Express multiplier device 20 stores the read requests 4 from each PCI Express device 30 in corresponding queues. After detecting three equal packets in the queues the PCI Express multiplier device 20 sends out a read request 4 to the host device 10 during transaction step 2. The PCI Express multiplier device 20 uses the attachment means 22 to send the read request 4 and the host device 10 uses the attachment means 12 for receiving the read request 4 during transaction step 2. During transaction step 3, the host device 10 sends back a read response package 5 to the PCI Express multiplier device 20. The host device 10 uses the attachment means 12 to send the read response package 5 and the PCI Express multiplier device 20 uses the attachment means 22 for receiving the read response package 5 during transaction step 3. The PCI Express multiplier device 20 copies the read response package 5 and sends the read response packages 5 to the three PCI Express devices 30 during transaction step 4. The PCI Express multiplier device 20 uses the attachment means 24, 26, 28 to send the read response packages 5 and the PCI Express devices 30 use the attachment means 32 to receive the read response package 5 during transaction step 4.

Figure 6A:
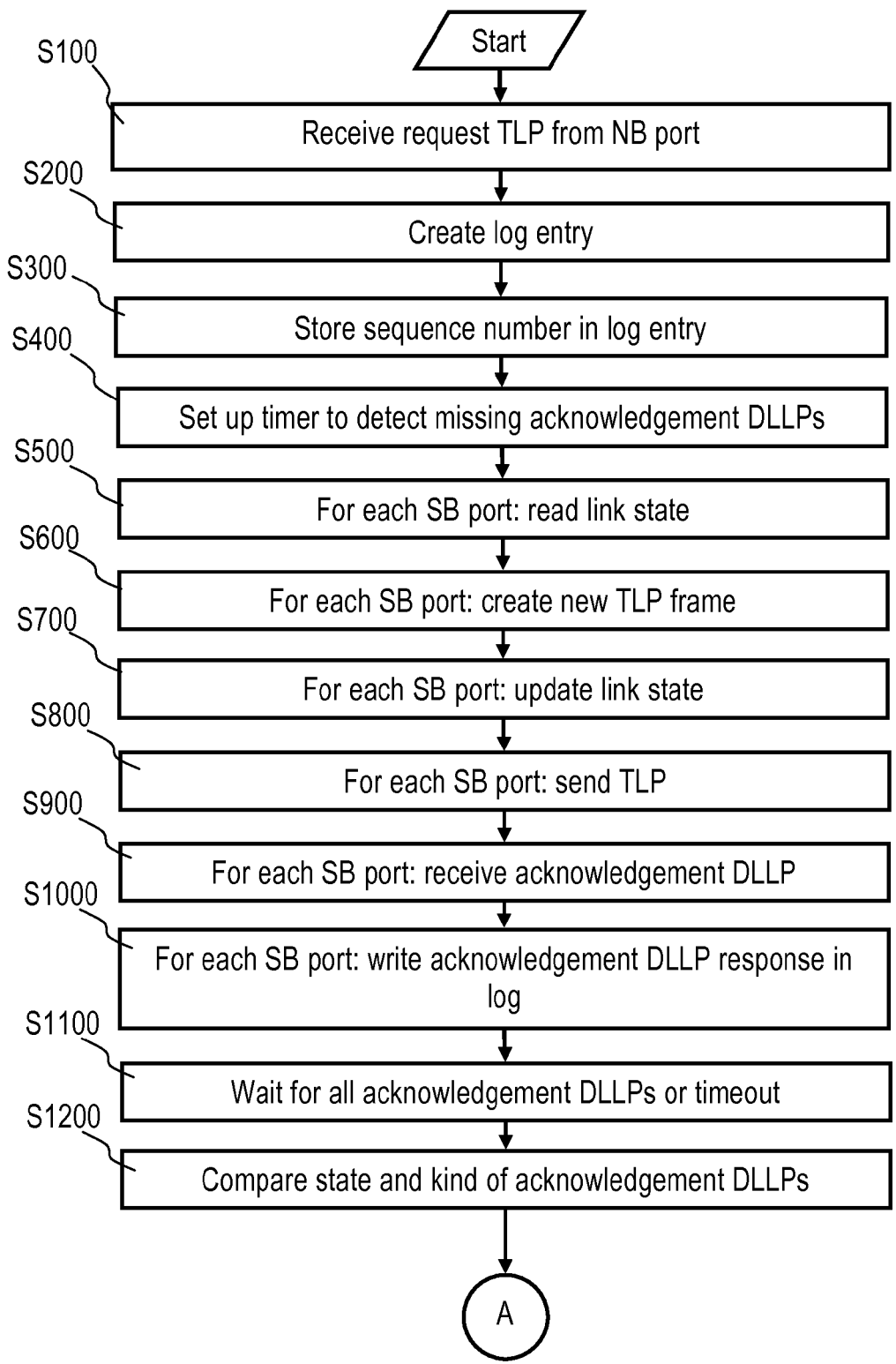
FIGS. 6A and 6B is a schematic flow chart of a downstream transaction in the computer system shown in FIG. 1.
Figure 6B:
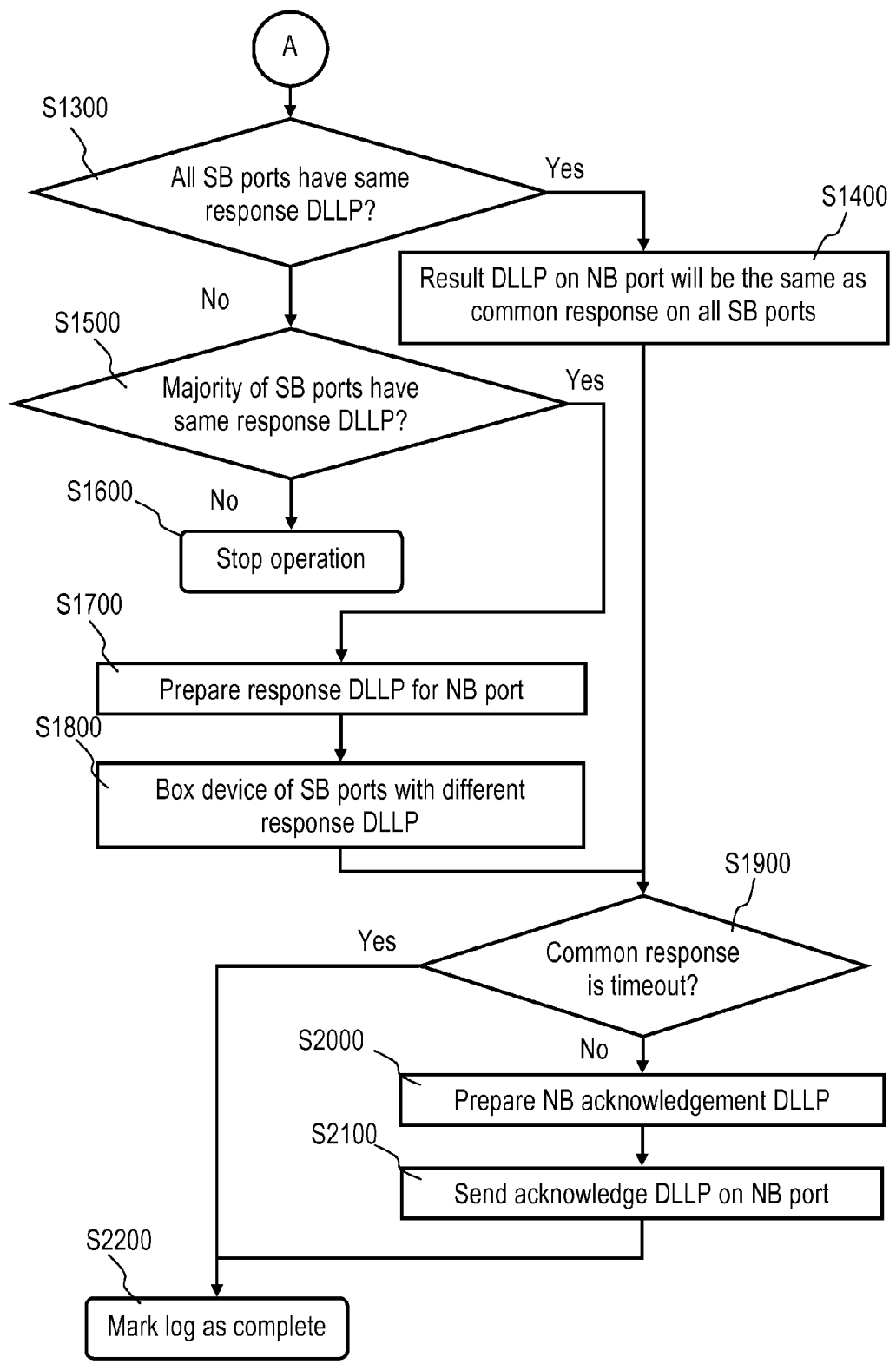
Figure 7A:
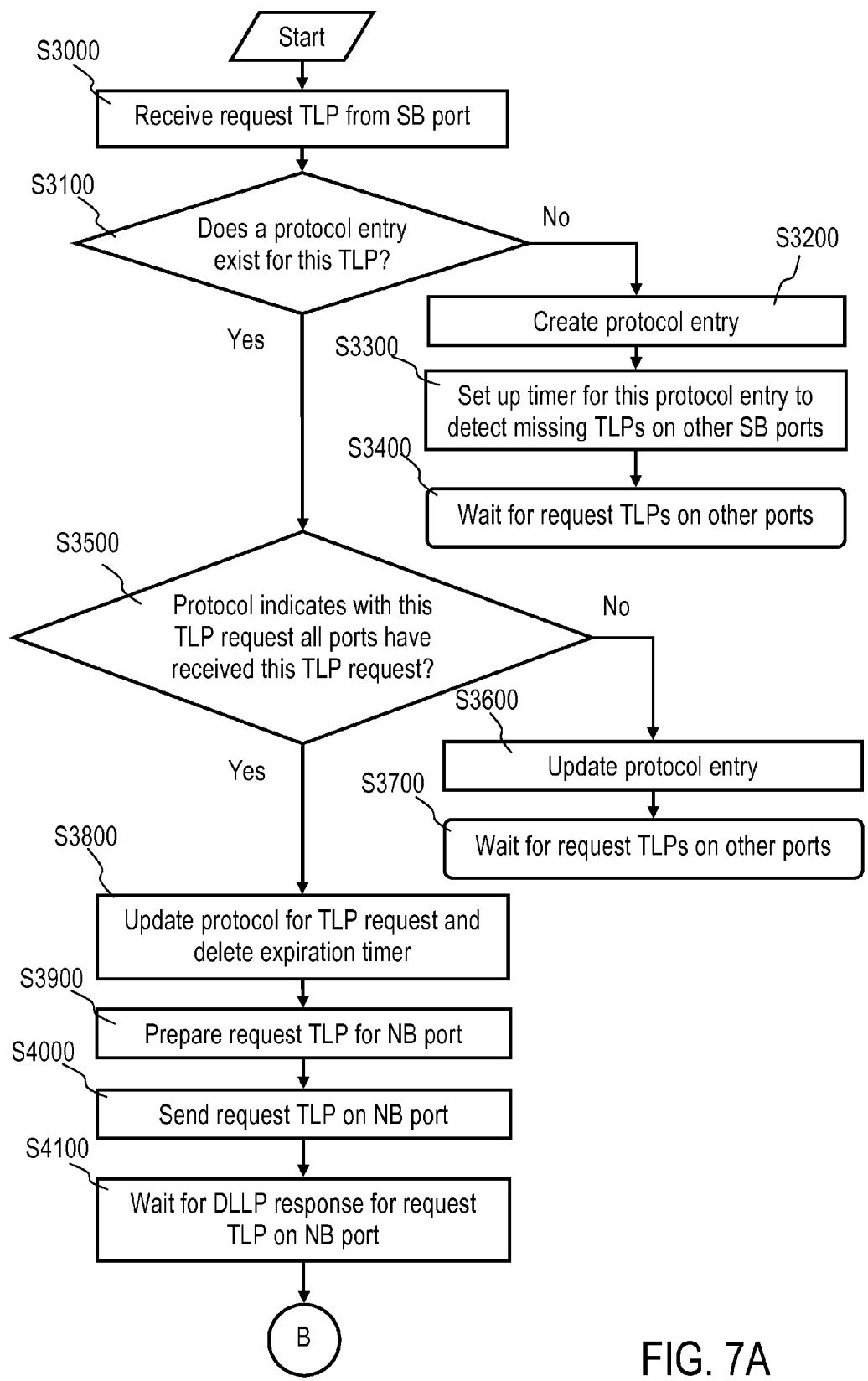
FIGS. 7A and 7B is a schematic flow chart of a first upstream transaction in the computer system shown in FIG. 1.
Figure 7B:
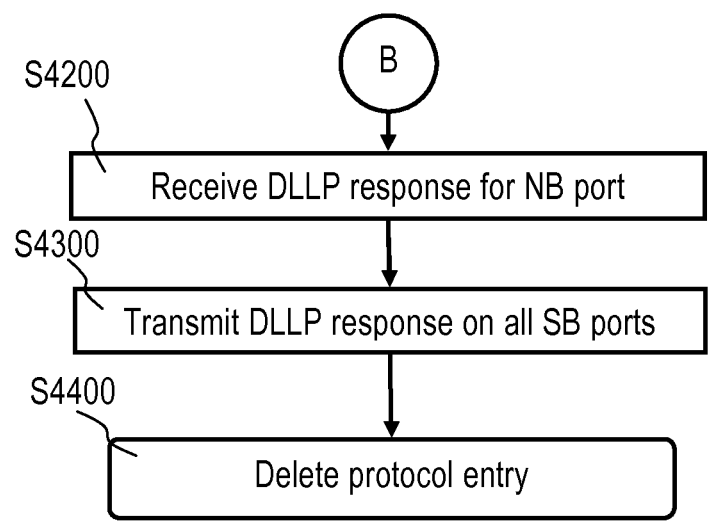
Figure 8:
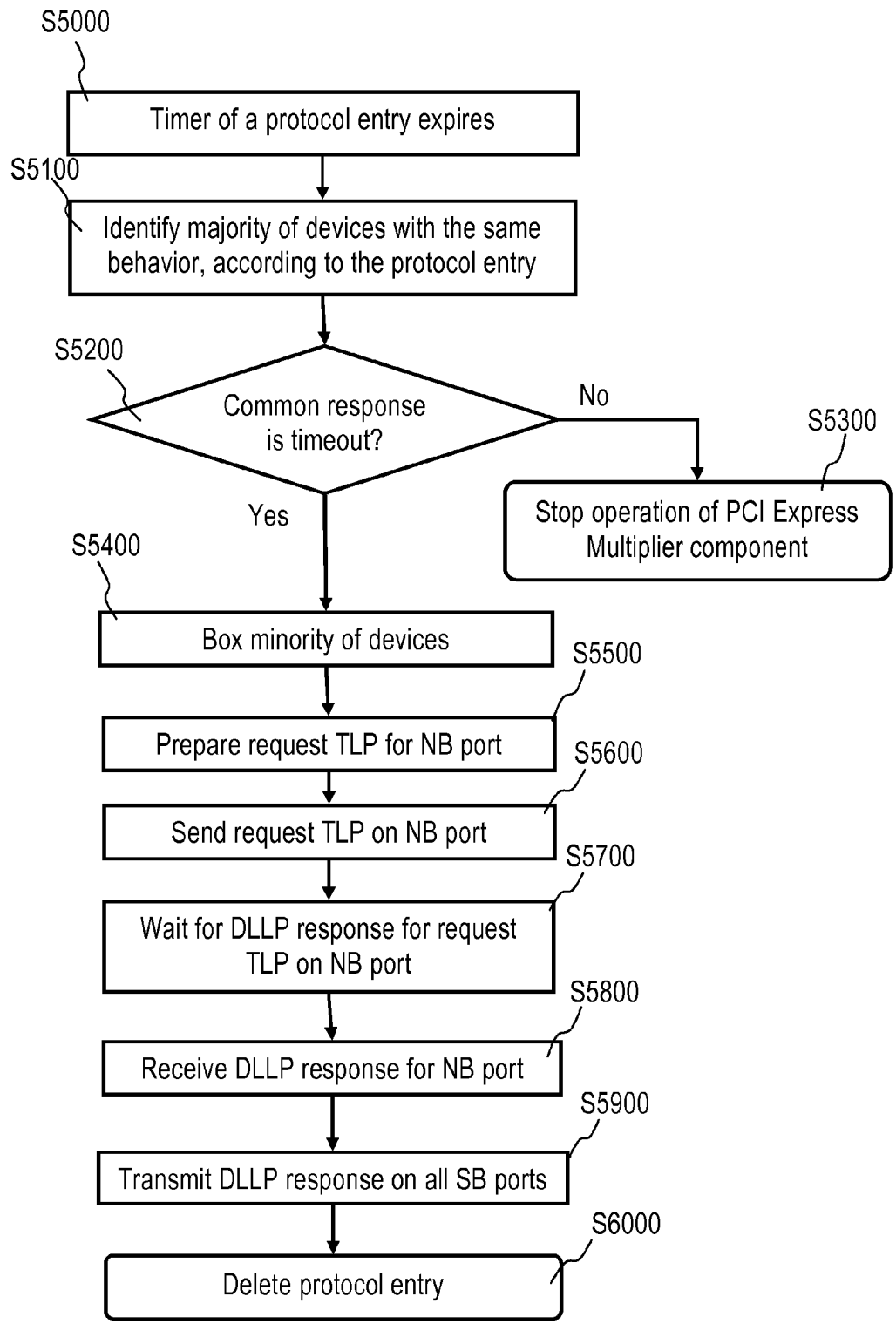
FIG. 8 is a schematic flow chart of a second upstream transaction in the computer system shown in FIG. 1.

FIGS. 6A and 6B is a schematic flow chart of a downstream transaction in the computer system 1, FIGS. 7A and 7B is a schematic flow chart of a first upstream transaction in the computer system 1, and FIG. 8 is a schematic flow chart of a second upstream transaction in the computer system 1.

In the following, the function of the PCI Express multiplier device 20 is explained referring to FIGS. 6A, 6B, 7A, 7B, and 8. In accordance with the shown embodiment of the computer system 1 one host device 10, one PCI Express multiplier device 20 and three PCI Express devices 30 are used. In the following, description northbound (NB) means upwards; i.e., the northbound port of the PCI Express multiplier device 20 is the port 22 towards the host device 10. Southbound (SB) means downwards; i.e., the southbound ports of the PCI Express multiplier device 20 are the ports 24, 26, 28 towards the PCI Express devices 30. Also, requests and completions are transport layer packets (TLPs), acknowledgements are data link layer packets (DLLPs). It is assumed that the PCI Express devices 30 are configured as accelerator devices without any other external connection.

A first posted PCI transaction consists in a downstream operation for request and acknowledgement, where typically the host device 10 sends a request transport layer packet (TLP) to the PCI Express multiplier device 20 and the PCI Express multiplier device 20 sends request transport layer packets (TLPs) to the PCI Express devices 30. The PCI Express devices 30 send acknowledgement data link layer packets (DLLPs) to the PCI Express multiplier device 20 and the PCI Express multiplier device 20 sends an acknowledgement data link layer packet (DLLP) to the host device 10. (Note: error handling is described in the detailed flow charts).

A first non-posted PCI transaction consists in a downstream operation for request and acknowledgement, and in an upstream operation for completion and acknowledgement. According to the downstream operation, the host device 10 typically sends a request transport layer packet (TLP) to the PCI Express multiplier device 20, and the PCI Express multiplier device 20 sends request transport layer packets (TLPs) to the PCI Express devices 30. The PCI Express devices 30 send acknowledgement data link layer packets (DLLPs) to the PCI Express multiplier device 20, and the PCI Express multiplier device 20 sends an acknowledgement data link layer packet (DLLP) to the host device 10. According to the upstream operation, the PCI Express devices 30 send completion request transport layer packets (TLPs) to the PCI Express multiplier device 20, and the PCI Express multiplier device 20 sends a completion request transport layer packet (TLP) to the host device 10. The host device 10 sends an acknowledgement data link layer packet (DLLP) to the PCI Express multiplier device 20, and the PCI Express multiplier device 20 sends acknowledgement data link layer packets (DLLPs) to the PCI Express devices 30 (Note: error handling is described in the detailed flow charts).

A second posted PCI transaction consists in an upstream operation for request and acknowledgement, where typically the PCI Express devices 30 send request transport layer packets (TLPs) to the PCI Express multiplier device 20 and the PCI Express multiplier device 20 sends a request transport layer packet (TLP) to the host device 10. The host device 10 sends an acknowledgement data link layer packet (DLLP) to the PCI Express multiplier device 20 and the PCI Express multiplier device 20 sends acknowledgement data link layer packets (DLLPs) to the PCI Express devices 30 (Note: error handling is described in the detailed flow charts).

A second non-posted PCI transaction consists in an upstream operation for request and acknowledgement, and in a downstream operation for completion and acknowledgement. According to the upstream operation, the PCI Express devices 30 typically send request transport layer packets (TLPs) to the PCI Express multiplier device 20, and the PCI Express multiplier device 20 sends a request transport layer packet (TLP) to the host device 10. The host device 10 sends an acknowledgement data link layer packet (DLLP) to the PCI Express multiplier device 20, and the PCI Express multiplier device 20 sends acknowledgement data link layer packets (DLLPs) to the PCI Express devices 30. According to the downstream operation, the host device 10 sends a completion request transport layer packet (TLP) to the PCI Express multiplier device 20, and the PCI Express multiplier device 20 sends completion request transport layer packets (TLPs) to the PCI Express devices 30. The PCI Express devices 30 send acknowledgement data link layer packets (DLLPs) to the PCI Express multiplier device 20, and the PCI Express multiplier device 20 sends an acknowledgement data link layer packet (DLLP) to the host device 10 (Note: error handling is described in the detailed flow charts).

Table 2 shows a summary of defined PCI Operations and mapping to Posted/Non-Posted.

In Table 2, completions are not considered as operations.

TABLE 2

| Operation as defined by the PCI standard | posted/non-posted |
|---|---|
| Memory Read Request (MRd) | non-posted |
| Memory Read Lock Request(MRdLk) | non-posted |
| Memory Write Request(MWr) | posted |
| IO Read Request(IORd) | non-posted |
| IO Write Request(IOWr) | non-posted |
| Config Type 0 Read Request(CfgRdO) | non-posted |
| Config Type 0 Write Request(CfgWr0) | non-posted |
| Config Type 1 Read Request(CfgRd1) | non-posted |
| Config Type 1 Write Request(CfgWr1) | non-posted |
| Message Request(Msg) | posted |
| Message Request W/Data | posted |

During initialization of the PCI Express multiplier device 20, the first PCI Express connection 30 on the northbound port 22 of the PCI Express multiplier device 20 is set up. Further, a presence signal on every southbound port 24, 26, 28 of the PCI Express multiplier device 20 are checked, to detect the ports 32 of the PCI Express devices 30. Furthermore, all southbound (SB) links 42 are verified, if they went active with same link rate and width in reaction to the presence signal (i.e. plugged adapter). Additionally, it is verified if all southbound (SB) links 42 with presence signal and same link rate and width are connected to the same sort of PCI Express devices 30. Therefore, PCI Vendor ID, Device ID, Class ID, and other parameters from configuration space can be checked. This is performed through PCI configuration read transactions. Further, it is check if the number of valid and identical endpoint devices 30 is sufficient for desired level of quality; e.g., two devices 30 for error detection, three devices 30 for error tolerance.

Referring to FIGS. 6a and 6B, the shown flow is applicable to a transport layer packet (TLP) operation with a data link layer packet (DLLP) acknowledgement, but without transport layer packet (TLP) response. The request goes from the host device 10 through the PCI Express multiplier device 20 to PCI Express devices 30. It is assumed that the physical layer is handled by the according fan-out components of the PCI Express multiplier device 20. Also, usual PCI Express operations like link error checking, CRC checking on the link, etc., take place on every of the ports 22, 24, 26, 28 of the PCI Express multiplier device 20. The flow is shown from the perspective of the PCI Express multiplier device 20. The flow is described for a request transport layer packet (TLP); however, this transport layer packet (TLP) could be the response to an upstream request transport layer packet (TLP).

According to step S100, a transport layer packet (TLP) request is received from the northbound port 22 which acts as endpoint to the host device. An error in physical or link Layer will cause a retransmission from the host device 10. According to step S200, a new log entry "P" is created in a protocol log. In step S300, a data link layer sequence number is read from the request packet and stored in the new log entry "P". In step S400, a timer is set up to handle missing acknowledgement data link layer packets (DLLPs). In step S500, for each southbound (SB) port 24, 26, 28 a link state, like sequence numbers to be used, are read from a link state table. In step S600 for each southbound (SB) port 24, 26, 28, a new request transport layer packet (TLP) frame is created. The original transaction layer content from step 100 will be copied. The data link layer contents will be created depending on the port state; e.g., sequence numbers etc. In step S700 for each Southbound (SB) port 24, 26, 28, outgoing sequence numbers are stored in the log entry "P", and the link state table for the links is updated; e.g., with sequence numbers used. In step S800 for each southbound (SB) port 24, 26, 28, a request transport layer packet (TLP) is send. According to step S900 for each southbound (SB) port 24, 26, 28, an incoming frame with positive or negative acknowledgement data link layer packets (DLLPs) is read. In step S1000 for each southbound (SB) port 24, 26, 28, sequence number from the acknowledgement data link layer packet (DLLP) is read and the acknowledgement for each southbound (SB) port 24, 26, 28 is reflected in the log entry "P". During step S1100, the PCI Express multiplier device 20 waits until all southbound (SB) ports 24, 26, 28 have received a positive or negative acknowledgement data link layer packet (DLLP) or the timer has expired. During step S1200 state; i.e., acknowledgement data link layer packet (DLLP) received or not received, and kind; i.e., positive or negative, of the acknowledgement data link layer packets (DLLPs) from the southbound (SB) links 42 are compared. In step S1300, it is checked, whether all southbound (SB) link acknowledgement data link layer packets (DLLPs) have the same state and kind. If all southbound (SB) link acknowledgement data link layer packets (DLLPs) have the same state and kind, the acknowledgement data link layer packet (DLLP) response on the northbound (NB) port 22 will have the common acknowledgement state and kind in step S1400. If not all southbound (SB) link acknowledgement data link layer packets (DLLPs) have the same state and kind, it is checked in step S1500, whether a majority of all southbound (SB) link acknowledgements are the same. If not, the operation is stopped in step S1600 and the PCI Express devices 30 or the PCI Express multiplier device 20 are not to be trusted anymore. If the majority of all southbound (SB) link acknowledgements are the same, a response data link layer packet (DLLP) for request on the northbound (NB) port 22 is prepared in step S1700. The state; i.e., acknowledgement data link layer packet (DLLP) received or timeout, and kind; i.e., positive or negative, of the acknowledgement data link layer packet (DLLP) of the majority of the southbound (SB) links 42 will be the response presented on the northbound (NB) link 40. In step S1800, all southbound (SB) ports 24, 26, 28 that have not presented the same data link layer packet (DLLP) response as the majority will be put into a boxed mode. The PCI Express multiplier device 20 can continue to run in degraded mode with the remaining ports that presented identical responses. This state can be logged to trigger service or a manual repair action. During step S1900 it is checked, whether the common data link layer packet (DLLP) reaction presented by all southbound (SB) links 42 was a timeout. If not, a data link layer packet (DLLP) frame to be sent out on the northbound (NB) port 22 is prepared in step S2000. The link layer sequence number will be matched with the link layer sequence number from the original request as stored in the log entry "P". In step S2100, the response frame as prepared in the previous step will be sent out on the northbound (NB) port 22. In step S2200, the log for post request is marked as complete. Step S2200 is also done, when the common data link layer packet (DLLP) reaction presented by all southbound (SB) links 42 turned out as timeout during the check according to step S1900.

Referring to FIGS. 7a and 7B, the shown flow is applicable to a transport layer packet (TLP) operation with a data link layer packet (DLLP) acknowledgement, but without transport layer packet (TLP) response. The request goes from the PCI Express devices 30 through the PCI Express multiplier device 20 to the host device 10. It is assumed that the physical layer is handled by the according fan-out components of the PCI Express multiplier device 20. Also, usual PCI Express operations like link error checking, CRC checking on the link, etc., take place on every of the ports 22, 24, 26, 28 of the PCI Express multiplier device 20. The flow is show from the perspective of the PCI Express multiplier device 20. The flow for a request transport layer packet (TLP) is described; however, this transport layer packet (TLP) could be the response to a downstream request transport layer packet (TLP).

According to step S3000, a transport layer packet (TLP) request is received from a southbound port 24, 26, 28 which acts as root complex to the PCI Express devices 30. An error in the physical or link layer will cause a retransmission from the PCI Express device 30. During step S3100 it is looked up, whether a log entry already exists for this transaction, wherein the transaction is identified by its complete transport layer packet (TLP) content. If the PCI Express devices 30 will present different transport layer packets (TLPs), then these transport layer packets (TLPs) will not be associated with the same protocol entry; leading implicitly to a check, whether the upstream transport layer packet (TLP) requests are identical. In step S3200, a protocol entry for the transport layer packet (TLP) is created, if no protocol entry exists for the transport layer packet (TLP). The entry contains the transport layer packet (TLP) as well as the information, which southbound (SB) port 24, 26, 28 has sent this transport layer packet (TLP), and data link information like sequence numbers. During step S3300, an expiration timer for this protocol entry is set up, to detect if other PCI Express devices 30 fail to send the same transport layer packet (TLP). During step S3400, it is waited for the transport layer packet (TLP) to be transmitted into other southbound (SB) ports 24, 26, 28. During step S3500, it is checked whether the protocol indicates, that all southbound (SB) ports 24, 26, 28 have sent the same request transport layer packet (TLP). According to step S3600, information of current transport layer packet (TLP) transmission from step 3000 is added to the protocol entry, including data link information like sequence numbers, if not all PCI Express devices 30 have sent the same transport layer packet (TLP) yet. During step S3700, it is waited for the missing PCI Express devices 30 to send the according request transport layer packet (TLP). According to step S3800 information of current transport layer packet (TLP) transmission from step 3000 is added to the protocol entry, including data link information like sequence numbers; and the expiration timer of protocol entry is also deleted, if all PCI Express devices 30 have sent the same transport layer packet (TLP). During step S3900, the transport layer packet (TLP) frame for transmission to the host device 10 is prepared, based on data stored in the protocol entry. In step S4000, the request transport layer packet (TLP) frame is sent to the host device 10. During step S4100, it is waited on the northbound (NB) port 22 for a data link layer packet (DLLP) response. In step S4200, the data link layer packet (DLLP) response; i.e., a positive or negative acknowledgement data link layer packet (DLLP), is received from the host device 10 on the northbound (NB) port 22. In step S4300, this data link layer packet (DLLP) response is transmitted to all southbound (SB) ports 24, 26, 28. Note that each data link layer packet (DLLP) frame will be adapted to include appropriate data link layer sequence numbers, as stored in the protocol entry. In step S4400, the protocol entry of the transport layer packet (TLP) is deleted.

Referring to FIG. 8, the shown flow also belongs to upstream transactions, but starting with a different trigger.

According to step S5000, the timer of a protocol entry expires. This means, a request transport layer packet (TLP) has been received by at least one PCI Express device 30, but not by all PCI Express devices 30 within the expiration time. In step S5100 it is identify, which PCI Express devices 30 have presented a transport layer packet (TLP) request to the PCI Express multiplier device 20. In step S5200 it is checked, whether a majority of PCI Express devices 30 has the same status for that transport layer packet (TLP); i.e., has received the same request transport layer packet (TLP) or has not received it. According to step S5300, the PCI Express multiplier device 20 stops operations, if there is no majority of PCI Express devices 30 with the same status for that transport layer packet (TLP). This is usually the case for only two southbound (SB) devices 30 that behave differently. In that case, the PCI Express multiplier device 20 cannot be sure, which PCI Express device 30 has behaved correctly and which device has behaved faulty. During step S5400, the minority of PCI Express devices 30 with the same status for this transport layer packet (TLP) will be boxed. This is usually the case, if one of the several PCI Express devices 30 behaves differently. This behavior is considered faulty and the PCI Express device 30 is isolated accordingly. The PCI Express multiplier device 20 can continue to run in degraded mode with the remaining ports that presented identical responses. This state can be logged to trigger service or a manual repair action.

The steps S5500 to S6000 are identical to the steps 3900 to 4400. During step S5500, the transport layer packet (TLP) frame for transmission to the host device 10 is prepared, based on data stored in the protocol entry. In step S5600, the request transport layer packet (TLP) frame is sent to the host device 10. During step S5700, it is waited on the northbound (NB) port 22 for a data link layer packet (DLLP) response. In step S5800, the data link layer packet (DLLP) response; i.e., a positive or negative acknowledgement data link layer packet (DLLP), is received from the host device 10 on the northbound (NB) port 22. In step S5900, this data link layer packet (DLLP) response is transmitted to all southbound (SB) ports 24, 26, 28. Note that each data link layer packet (DLLP) frame will be adapted to include appropriate data link layer sequence numbers, as stored in the protocol entry. In step S6000, the protocol entry of the transport layer packet (TLP) is deleted.

The inventive method for operating PCI Express devices in a computer system can be implemented as an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A PCI Express multiplier device comprising:
at least two device attachers to attach at least two identical PCI Express devices;
a root complex attacher to attach a PCI Express root complex;
a copier to copy and forward PCI Express data packets from said root complex to all of said attached identical devices;
a collector to collect PCI Express data packets sent from said attached identical devices to said root complex; and
a selector responsive to said collecting means to select and forward PCI Express data packets from said collected PCI Express to said root complex, wherein said root complex is a component of a computer system and wherein said attached devices are accelerators for said computer system, said selector further comprising:
a comparator to compare related response packages for data equality; and
a forwarder responsive to said comparator for forwarding one of said related response packages in case all said related response packages comprise equal data.

2. A computer system comprising:
a host device, comprising a processor and a memory, running operating system software and application software;
at least two identical PCI Express devices;
a PCI Express multiplier device, providing access to said at least two identical PCI Express devices through presenting said identical PCI Express devices as single PCI Express device, acting as PCI Express endpoint to said host device, and acting as root complex to said identical PCI Express devices, thereby acting transparently during initialization and operation of said identical PCI Express devices;
a PCI Express connection, coupling said host device and said PCI Express multiplier device; and
a PCI Express connection between said PCI Express multiplier device and said at least two PCI Express devices, wherein said PCI Express multiplier device detects errors and silent data corruption through comparing results of PCI Express transactions between said PCI Express multiplier device and said at least two PCI Express devices.

3. The computer system of claim 2, wherein the PCI Express multiplier device is able to correct errors and silent data corruption when at least three identical PCI Express devices are representing a single PCI Express device through said PCI Express multiplier device, where the best k out of n parallel results of a PCI Express transaction on said links between said PCI Express multiplier device and said at least three identical PCI Express devices are used, wherein n is a number greater than 2 and k is a number greater than n/2.

4. The computer system according to claim 2, where detection of different transactions on said links between the PCI Express multiplier device and said identical PCI Express devices is performed by comparing CRC (Cyclic Redundancy Check) checksums of said transactions instead of comparing said entire transactions.

5. The computer system according to claim 2, where logging to said host device is performed on detection or correction of errors and silent data corruption.

6. The computer system according to claim 2, where isolation of faulty PCI Express devices is performed on detection or correction of errors and silent data corruption.

7. A method for operating PCI Express devices in a computer system comprising a host device, the host device comprising a processor and a memory, running operating system software and application software, and at least two identical PCI Express devices, the method comprising the steps of:

providing access to said at least two identical PCI Express devices through presenting said identical PCI Express devices as single PCI Express device by using a PCI Express multiplier device acting as PCI Express endpoint to said host unit and acting as root complex to said identical PCI Express devices, wherein PCI Express data packets sent from said attached identical devices to said root complex are collected and compared for data equality, wherein one PCI Express data packet of said collected PCI Express data packets is selected and forwarded to said root complex based on said comparison.

* * * * *